US012746814B2

(12) United States Patent
Back

(10) Patent No.: US 12,746,814 B2
(45) Date of Patent: Sep. 29, 2026

(54) OPENING/CLOSING APPARATUS FOR DISCHARGE LINE OF FUEL CELL ELECTRIC VEHICLE

(71) Applicants: Hyundai Motor Company, Seoul (KR); Kia Corporation, Seoul (KR)

(72) Inventor: Jong Wook Back, Seongnam (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 635 days.

(21) Appl. No.: 18/214,846

(22) Filed: Jun. 27, 2023

(65) Prior Publication Data

US 2024/0270064 A1 Aug. 15, 2024

(30) Foreign Application Priority Data

Feb. 14, 2023 (KR) ........................ 10-2023-0019695
Mar. 24, 2023 (KR) ........................ 10-2023-0038648

(51) Int. Cl.
*B60K 15/03* (2006.01)
*B60K 15/077* (2006.01)

(52) U.S. Cl.
CPC ............ *B60K 15/03* (2013.01); *B60K 15/077* (2013.01); *B60K 15/03006* (2013.01); *B60K 2015/03026* (2013.01); *B60K 2015/03315* (2013.01); *B60K 2015/03328* (2013.01)

(58) Field of Classification Search
CPC B60K 15/03; B60K 15/077; B60K 15/03006; B60K 2015/03315; B60K 2015/03328; B60K 2015/03026
USPC .......... 137/825, 377, 381, 583, 589, 625.39, 137/630.11
See application file for complete search history.

(56) References Cited

U.S. PATENT DOCUMENTS 5,474,104 A * 12/1995 Borland ................. B60K 15/04 137/381
5,511,576 A * 4/1996 Borland ................ F16K 17/383 137/72
5,782,259 A * 7/1998 Ledbetter ................ F16K 17/04 137/71
(Continued)

FOREIGN PATENT DOCUMENTS

JP 2011-149545 A 8/2011
KR 10-2010-0051189 A 5/2010
(Continued)

*Primary Examiner* — Minh Q Le
(74) *Attorney, Agent, or Firm* — Fox Rothschild LLP

(57) ABSTRACT

An opening/closing apparatus for a discharge line from one or more hydrogen tanks of a fuel cell electric vehicle includes a body part provided at an outlet end of the discharge line configured to discharge a target fluid to outside in a first direction, the body part having a discharge part configured to discharge the target fluid to the outside in a second direction intersecting the first direction, a guide part configured to surround a periphery of the discharge part and guide the target fluid, which has passed through the discharge part, in the first direction, and an opening/closing part configured to selectively open or close the discharge part based on discharge pressure of the target fluid, in order to ensure a stable discharge of the target fluid through the discharge line and effectively protect the outlet end of the discharge line.

17 Claims, 11 Drawing Sheets

(56) References Cited

U.S. PATENT DOCUMENTS

| | | | | |
|---|---|---|---|---|
| 7,748,407 | B2 * | 7/2010 | Colby | F41B 11/724 222/3 |
| 8,636,165 | B2 | 1/2014 | Handa | |
| 10,167,970 | B2 | 1/2019 | Lee et al. | |
| 10,337,643 | B2 * | 7/2019 | Hausmann | F17C 13/04 |
| 2005/0150548 | A1 * | 7/2005 | Kita | F16K 17/383 137/72 |
| 2008/0011361 | A1 | 1/2008 | Larsen et al. | |
| 2011/0180551 | A1 | 7/2011 | Handa | |
| 2013/0008730 | A1 * | 1/2013 | Yahashi | H01M 8/04201 180/65.31 |
| 2014/0097365 | A1 * | 4/2014 | Young | F16K 31/50 251/63.4 |
| 2014/0166121 | A1 * | 6/2014 | Jung | H01M 8/04126 137/154 |
| 2015/0053274 | A1 * | 2/2015 | Gordon | G01F 1/34 137/557 |
| 2020/0089260 | A1 * | 3/2020 | Jung | G05D 16/106 |
| 2020/0365917 | A1 * | 11/2020 | Ham | F16K 17/38 |
| 2022/0307651 | A1 * | 9/2022 | Bartlok | F17C 7/04 |

FOREIGN PATENT DOCUMENTS

| | | | |
|---|---|---|---|
| KR | 10-1578778 | B1 | 12/2015 |
| KR | 10-2017-0022764 | A | 3/2017 |

* cited by examiner

OPENING/CLOSING APPARATUS FOR DISCHARGE LINE OF FUEL CELL ELECTRIC VEHICLE

CROSS-REFERENCE TO RELATED APPLICATION

This application claims under 35 U.S.C. § 119(a) the benefit of Korean Patent Application No. 10-2023-0019695 filed in the Korean Intellectual Property Office on Feb. 14, 2023 and Korean Patent Application No. 10-2023-0038648 filed in the Korean Intellectual Property Office on Mar. 24, 2023, the entire contents of which are incorporated herein by reference.

BACKGROUND

(a) Technical Field

The present disclosure relates to an opening/closing apparatus for a discharge line, more particularly, to the opening/closing apparatus for the discharge line (e.g., a hydrogen discharge line) from one or more hydrogen tanks of a fuel cell electric vehicle, the opening/closing apparatus being capable of effectively protecting an outlet end of the discharge line while ensuring a stable discharge of a target fluid through the discharge line.

(b) Description of the Related Art

A fuel cell electric vehicle (FCEV) produces electrical energy from an electrochemical reaction between oxygen and hydrogen in a fuel cell stack and uses the electrical energy as a power source.

The fuel cell electric vehicle may continuously generate electricity, regardless of a capacity of a battery, by being supplied with fuel and air from outside, and thus has high efficiency, and emits almost no contaminant. By virtue of these advantages, continuous research and development is being conducted on the fuel cell electric vehicle.

A plurality of hydrogen tanks may be provided in the fuel cell electric vehicle, and hydrogen is stored in the hydrogen tanks along a hydrogen charging line of an opening/closing apparatus. The hydrogen stored in the hydrogen tanks is depressurized by a regulator, supplied to the fuel cell stack along a hydrogen supply line, and then used to produce electrical energy.

A thermally activated pressure relief device (TPRD) and a pressure relief valve (PRV) may be provided in an outlet of the hydrogen tank. The TPRD may forcibly discharge hydrogen to outside when a temperature of the hydrogen tank increases (e.g., when a temperature is increased by a fire), and the PRV may remove overpressure in the hydrogen tank. The hydrogen discharged from the respective hydrogen tanks may be discharged to the outside through a single integrated discharge line.

Meanwhile, an outlet of the discharge line is manufactured to be directed upwardly (into the air in the gravitational direction) to meet the regulations that a direction of a discharge of hydrogen through the discharge line should not be directed toward a passenger space of a vehicle or the hydrogen tank. Further, the regulations prescribe that an outlet end of the discharge line should be protected by a separate protection device such as a cap (or a closure).

However, in the related art, after the cap for protecting the outlet end of the discharge line is detached from the outlet end of the discharge line once (i.e., after the cap is detached from the outlet end of the discharge line and then hydrogen is discharged through the discharge line), the cap may not be returned to a closed position at which the cap closes the outlet end of the discharge line. For this reason, there is a problem in that the outlet end of the discharge line is exposed directly to the outside in an opened state in which the outlet end of the discharge line cannot be protected by the cap.

In particular, rainwater, foreign substances, and the like may be introduced via the outlet end of the discharge line while it is opened upwardly, which causes problems in that corrosion and malfunction may occur and vehicle safety and reliability may be deteriorated.

While various studies have been conducted to effectively protect the outlet end of the discharge line to ensure stable discharge of a target fluid through the discharge line, appropriate technical solutions have not been implemented. Accordingly, there is a need to develop a technology to effectively protect the outlet end of the discharge line while ensuring stable discharge of the target fluid through the discharge line.

SUMMARY

The present disclosure provides an opening/closing apparatus capable of effectively protecting an outlet end of a discharge line while ensuring stable discharge of a target fluid through the discharge line.

In particular, the present disclosure has been made in an effort to suppress introduction of foreign substances into the discharge line and improve safety and reliability while meeting regulations related to a discharge direction of the target fluid (i.e., the target fluid needs to be discharged in an upward direction, that is, in an upward gravitational direction).

In addition, the present disclosure is configured to stably protect the outlet end of the discharge line without performing a separate additional assembling process after the outlet end of the discharge line is opened.

In addition, the present disclosure is configured to enable a cap member to autonomously move to a position at which the cap member closes a discharge part again when the target fluid is completely discharged through the discharge line.

The present disclosure is configured to prevent a loss of the cap member.

The objects to be achieved by the embodiments are not limited to the above-mentioned objects, but also include objects or effects that may be understood from the solutions or embodiments described below.

To achieve the above-mentioned objects, an exemplary embodiment of the present disclosure provides an opening/closing apparatus including: a body part provided at an outlet end of a discharge line configured to discharge a target fluid to outside in a first direction, the body part having a discharge part configured to discharge the target fluid to the outside in a second direction intersecting the first direction; a guide part configured to surround a periphery of the discharge part and guide the target fluid, which has passed through the discharge part, in the first direction; and an opening/closing part configured to selectively open or close the discharge part based on discharge pressure of the target fluid.

This is to effectively protect the outlet end of the discharge line while ensuring a stable discharge of the target fluid through the discharge line.

That is, in the related art, after the cap for protecting the outlet end of the discharge line is detached from the outlet end of the discharge line once (i.e., after the cap is detached from the outlet end of the discharge line and then hydrogen is discharged through the discharge line), the cap may not be returned to a closed position at which the cap closes the outlet end of the discharge line. For this reason, there is a problem in that the outlet end of the discharge line is exposed directly to the outside in an opened state in which the outlet end of the discharge line cannot be protected by the cap. In particular, rainwater, foreign substances, and the like may be introduced through the outlet end of the discharge line that is opened upward, which causes problems in that corrosion and malfunction may occur and safety and reliability deteriorate.

However, in the embodiment of the present disclosure, the outlet end of the discharge part may be directed in the second direction, which intersects the first direction, instead of the first direction, and the target fluid having passed through the discharge part may be guided in the first direction by means of the guide part. Therefore, it is possible to obtain an advantageous effect of meeting the regulations related to the discharge direction of the target fluid (the target fluid needs to be discharged upward in the gravitational direction), preventing the target fluid from being introduced into an object (e.g., vehicle), minimizing a degree to which rainwater, foreign substances, and the like are introduced through the outlet end of the discharge part, and improving safety and reliability.

Among other things, in the embodiment of the present disclosure, the discharge part configured to discharge the target fluid may be exposed through a lateral side of the body part without being exposed in the first direction (gravitational direction). Therefore, it is possible to obtain an advantageous effect of minimizing a degree to which foreign substances such as rainwater are introduced into the discharge part.

In addition, in the embodiment of the present disclosure, the cap member may be autonomously moved by the weight of the cap member and a shaft part back to the position at which the cap member closes the discharge part without performing a separate additional assembling process when the target fluid is completely discharged (the discharge pressure applied to the shaft part by the target fluid is eliminated). Therefore, it is possible to obtain an advantageous effect of effectively protecting the outlet end of the discharge line while ensuring the stable discharge of the target fluid.

In particular, according to the embodiment of the present disclosure, it is possible to obtain an advantageous effect of preventing the outlet end of the discharge line from being exposed directly to the outside in an opened state in which the outlet end of the discharge line cannot be protected by the cap member after the target fluid is discharged through the discharge line. Further, it is possible to obtain an advantageous effect of inhibiting rainwater and foreign substances from being introduced through the outlet end of the discharge line.

The discharge part may have various structures capable of discharging the target fluid in a direction intersecting the first direction.

According to the exemplary embodiment of the present disclosure, the discharge part may include a plurality of discharge holes spaced apart from one another in a circumferential direction of the body part.

According to the exemplary embodiment of the present disclosure, a sum of cross-sectional areas of the plurality of discharge holes may be larger than a cross-sectional area of the discharge line.

As described above, because the sum of the cross-sectional areas of the plurality of discharge holes may be larger than the cross-sectional area of the discharge line, it is possible to reduce the pressure of the target fluid passing through the discharge hole and induce a more effective discharge of the target fluid.

According to the exemplary embodiment of the present disclosure, the body part may include: a first body connected to the outlet end of the discharge line; and a second body having a passing hole through which a part of the shaft part passes, the second body being configured to define an accommodation space for accommodating the shaft part in cooperation with the first body.

According to the exemplary embodiment of the present disclosure, one end of the shaft part may be exposed to outside of the second body through the passing hole, and the cap member may be connected to one end of the shaft part.

Alternatively, a connection protrusion, which may be accommodated in the passing hole, may be provided on the inner surface of the cap member, and the shaft part and the cap member may be connected by means of the connection protrusion.

According to the exemplary embodiment of the present disclosure, the opening/closing apparatus may include an inclined guide portion provided on an inner surface of the guide part so as to face the discharge part and configured to guide the target fluid in the upward direction.

As described above, in the embodiment of the present disclosure, because the inclined guide portion is provided on the inner surface of the guide part, the target fluid discharged through the discharge part may naturally flow in the upward direction along the inclined guide portion. Therefore, it is possible to obtain an advantageous effect of further improving performance and efficiency in discharging the target fluid.

The opening/closing part may have various structures capable of selectively opening or closing the discharge part based on the discharge pressure of the target fluid.

According to the exemplary embodiment of the present disclosure, the opening/closing part may include: a shaft part configured to be selectively movable upward or downward relative to the body part in response to pressure of the target fluid; and a cap member connected to the shaft part and configured to be movable in response to the upward or downward movement of the shaft part from a first position at which the cap member closes the discharge part to a second position at which the cap member opens the discharge part.

According to the exemplary embodiment of the present disclosure, the shaft part may include a shaft body configured to be accommodated in the body part so as to be movable upward or downward, and a shaft plate provided at an end of the shaft body so as to cover the discharge line and configured to selectively move upward or downward in response to the discharge pressure of the target fluid.

The cap member may have various structures capable of selectively closing the discharge part based on the upward movement of the shaft part.

According to the exemplary embodiment of the present disclosure, the cap member may include a cap head connected to one end of the shaft part, and a cap body provided along a periphery of an edge of the cap head so as to cover the discharge part and configured to selectively open or close the discharge part in response to the upward or downward movement of the shaft part.

According to the exemplary embodiment of the present disclosure, the opening/closing apparatus may include an accommodation portion provided in the cap head and configured to accommodate one end of the shaft part. The arrangement state (connection state) of the cap member with respect to the shaft part may be fixed as one end of the shaft part is accommodated in the accommodation portion.

According to the exemplary embodiment of the present disclosure, the opening/closing apparatus may include: a first screw thread portion provided on an outer peripheral surface of one end of the shaft part; and a second screw thread portion provided on the accommodation portion so as to engage with the first screw thread portion.

According to the exemplary embodiment of the present disclosure, the opening/closing apparatus may include an elastic support part configured to provide an elastic force to move the cap member from the second position at which the cap member opens the discharge part to the first position at which the cap member closes the discharge part.

As described above, in the embodiment of the present disclosure, the movement of the shaft part relative to the body part may be elastically supported by the elastic support part. Therefore, it is possible to obtain an advantageous effect of stably maintaining the state in which the cap member is disposed at the first position (the state in which the discharge part is closed) and minimizing malfunction of the cap member caused by impact or the like.

Various elastic members capable of elastically supporting the movement of the shaft part relative to the body part may be used as the elastic support part.

According to the exemplary embodiment of the present disclosure, the elastic support part may include a spring member having one end supported on the body part, and the other end supported on the shaft part.

According to the exemplary embodiment of the present disclosure, the spring member may be provided to have a diameter that gradually decreases in a direction from one end to the other end. As described above, in the embodiment of the present disclosure, because the spring member is provided in the form of a tapered spring, it is possible to obtain an advantageous effect of ensuring assembling properties of the spring member and minimizing swaying (free movements in leftward/rightward directions) of the spring member.

According to the exemplary embodiment of the present disclosure, the opening/closing apparatus may include a stopper configured to restrict a movement of the cap member relative to the body part when the discharge part is opened.

The stopper may have various structures capable of suppressing the movement of the cap member (the movement in the upward direction) in the state in which the cap member is moved to the second position.

According to the exemplary embodiment of the present disclosure, the stopper may be provided on the shaft part so as to be restrained by an inner surface of the body part.

According to the exemplary embodiment of the present disclosure, the opening/closing apparatus may include a sealing member configured to seal a gap between the passing hole and the shaft part.

The sealing member may have various structures capable of sealing (blocking) a gap between the passing hole and the shaft part.

As described above, in the embodiment of the present disclosure, because the gap between the passing hole and the shaft part is blocked by the sealing member, it is possible to prevent the discharge pressure of the target fluid from being applied to the inner surface of the cap member through the gap between the passing hole and the shaft part. Therefore, it is possible to obtain an advantageous effect of suppressing the separation of the cap member caused by the discharge pressure of the target fluid and stably maintaining the arrangement state of the cap member.

According to the exemplary embodiment of the present disclosure, the cap member may have an outer diameter corresponding to the guide part.

This is based on the Coanda effect that states that a fluid (target fluid) has the property of flowing along a flow surface of an object (adhering to the flow surface). Because the cap member has the outer diameter corresponding to the guide part, the target fluid being discharged along the guide part may be moved in the first direction (gravitational direction) along the peripheral surface of the cap member by the Coanda effect. Therefore, it is possible to obtain an advantageous effect of more assuredly meeting the regulations related to the discharge direction of the target fluid.

According to the exemplary embodiment of the present disclosure, the opening/closing apparatus may include: an inclined contact portion provided on the cap member, in which the inclined contact portion comes into contact with the inclined guide portion when the cap member moves to the first position.

As described above, the embodiment of the present disclosure may provide a double-closing structure in which the cap member closes the discharge part and the contact between the inclined contact portion and the inclined guide portion closes the discharge part. Therefore, it is possible to obtain an advantageous effect of more stably maintaining the closed state of the discharge part and more effectively suppressing the introduction of foreign substances into the discharge part.

According to the exemplary embodiment of the present disclosure, the opening/closing apparatus may include a cap sealing member configured to seal a gap between the guide part and the cap member.

According to the exemplary embodiment of the present disclosure, the cap sealing member may be integrated, by injection molding, with the inclined contact portion so as to be in elastic contact with the inclined guide portion.

As described above, in the embodiment of the present disclosure, because the cap sealing member blocks the gap between the guide part and the cap member, it is possible to obtain an advantageous effect of minimizing a degree to which water is introduced into the discharge part (discharge hole) from outside of the cap member through the gap between the guide part and the cap member. In particular, in the embodiment of the present disclosure, because the cap sealing member is provided in the gap between the guide part and the cap member, it is possible to obtain an advantageous effect of minimizing a degree to which water, which has been introduced in the horizontal direction, is introduced into the discharge part (discharge hole) and the gap between the guide part and the cap member.

According to the exemplary embodiment of the present disclosure, a vehicle may include the opening/closing apparatus.

In particular, a fuel cell electric vehicle may include the opening/closing apparatus.

In addition, although described with respect to a fuel cell electric vehicle, the opening/closing apparatus may be used with other types of vehicles and/or other types of discharge lines, and for example, be utilized in a non-vehicle environment.

DETAILED DESCRIPTION

Figure 1:
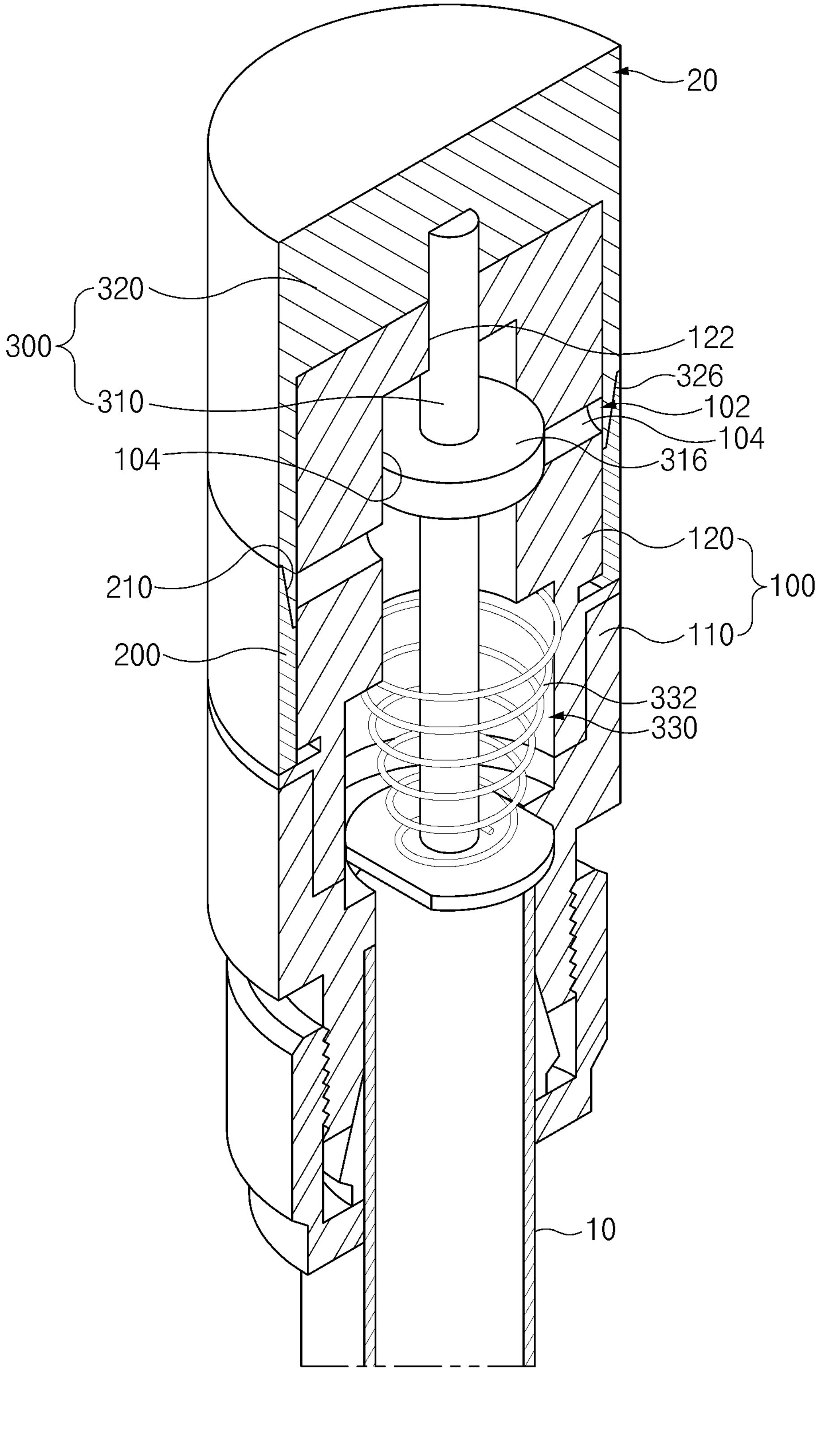
FIG. 1 is a schematic view of an opening/closing apparatus according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

The present disclosure is applicable to an opening/closing apparatus arranged to open or close a discharge line (e.g., a hydrogen discharge line) from one or more hydrogen tanks of a fuel cell electric vehicle, in order to ensure a stable discharge of a target fluid (e.g., hydrogen) through the discharge line. In addition, although described with respect to a fuel cell electric vehicle, the opening/closing apparatus may be used with other types of vehicles and/or other types of discharge lines, and for example, be utilized in a non-vehicle environment.

With reference to FIGS. 1 to 11, an opening/closing apparatus 20 according to an embodiment of the present disclosure includes: a body part 100 having a discharge part 102 provided at an outlet end of a discharge line 10 configured to discharge a target fluid to outside in a first direction (e.g., gravitational direction), the discharge part 102 being configured to discharge the target fluid to the outside in a second direction intersecting the first direction; a guide part 200 configured to surround a periphery of the discharge part 102 and guide, in the first direction, the target fluid having passed through the discharge part 102; and an opening/closing part 300 configured to selectively open or close the discharge part 102 based on discharge pressure of the target fluid.

For reference, the opening/closing apparatus 20 according to the embodiment of the present disclosure may be applied to the outlet end of the discharge line 10 through which the target fluid may be discharged to the outside. The present disclosure is not restricted or limited by the type and properties of the target fluid discharged along the discharge line 10.

For example, the opening/closing apparatus 20 according to the embodiment of the present disclosure may be applied to the outlet end of the discharge line 10 through which hydrogen discharged from a storage container (e.g., a hydrogen tank) is discharged to the outside.

The discharge line 10 may have various structures capable of discharging the target fluid (hydrogen), which is stored in a storage container (not illustrated), to the outside in the first direction (e.g., gravitational direction). The present disclosure is not restricted or limited by the structure and shape of the discharge line 10.

Hereinafter, an example will be described in which the discharge line 10 has an approximately straight shape. According to another embodiment of the present disclosure, the discharge line may have a curved shape or other shapes.

Further, the storage container connected to the discharge line 10 may be variously changed in number in accordance with required conditions and design specifications. The present disclosure is not restricted or limited by the number of storage containers. For example, a plurality of storage containers may be connected in parallel to the discharge line 10, and hydrogen discharged from each storage container may be discharged to the outside along the discharge line 10.

For reference, in the embodiment of the present disclosure, the first direction may be understood as including not only the gravitational direction (or an upward/downward direction perpendicular to the ground surface) according to governmental regulations (e.g., regulations on the safety of pressure-resistant containers for vehicles) but also directions inclined with respect to the gravitational direction.

According to the exemplary embodiment of the present disclosure, the first direction may be defined as an upward direction of a vehicle body based on the vehicle body of the vehicle. Alternatively, the first direction may be defined as an upward/downward direction perpendicular to the gravitational direction or ground surface.

The body part 100 is connected to the outlet end of the discharge line 10 to discharge the target fluid, which is supplied along the discharge line 10, in the second direction (e.g., horizontal direction) intersecting the first direction.

More specifically, the body part 100 includes the discharge part 102 configured to discharge the target fluid to the outside in the second direction intersecting the first direction. The target fluid, which is supplied to the body part 100 along the discharge line 10, may be discharged to the outside through the discharge part 102.

In this case, the configuration in which the discharge part 102 discharges the target fluid in the second direction intersecting the first direction may be understood as a configuration in which a discharge direction of the target fluid discharged through the discharge part 102 is defined to intersect the first direction.

For example, the discharge part 102 may be provided in the horizontal direction (a direction parallel to the ground surface) perpendicular to the first direction (e.g., gravitational direction). The target fluid may be discharged in the horizontal direction through the discharge part 102. According to another embodiment of the present disclosure, the discharge part may be inclined with respect to the horizontal direction.

The discharge part 102 may have various structures capable of discharging the target fluid in the direction intersecting the first direction. The present disclosure is not restricted or limited by the structure and shape of the discharge part 102.

According to the exemplary embodiment of the present disclosure, the discharge part 102 may include a plurality of discharge holes 104 spaced apart from one another in a circumferential direction of the body part 100.

Figure 2:
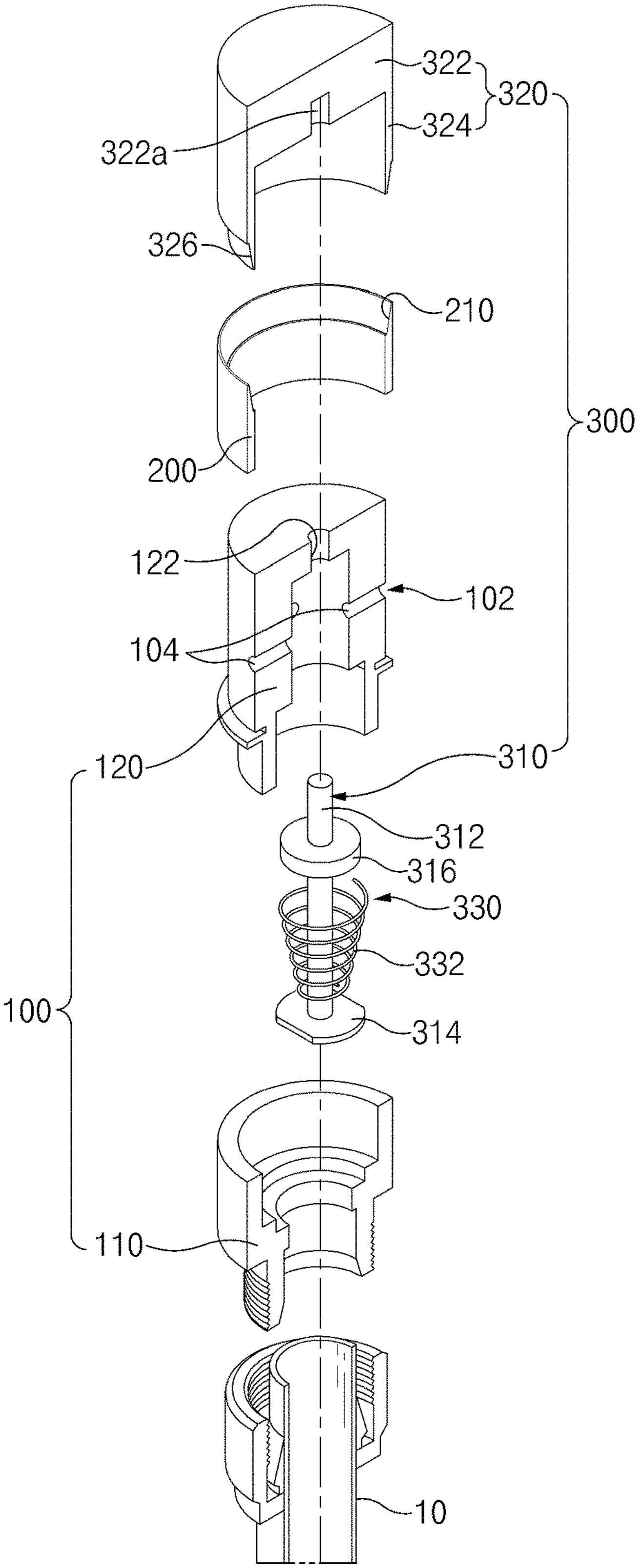
FIG. 2 is an exploded perspective view of the opening/closing apparatus according to the embodiment of the present disclosure.
Figure 3:
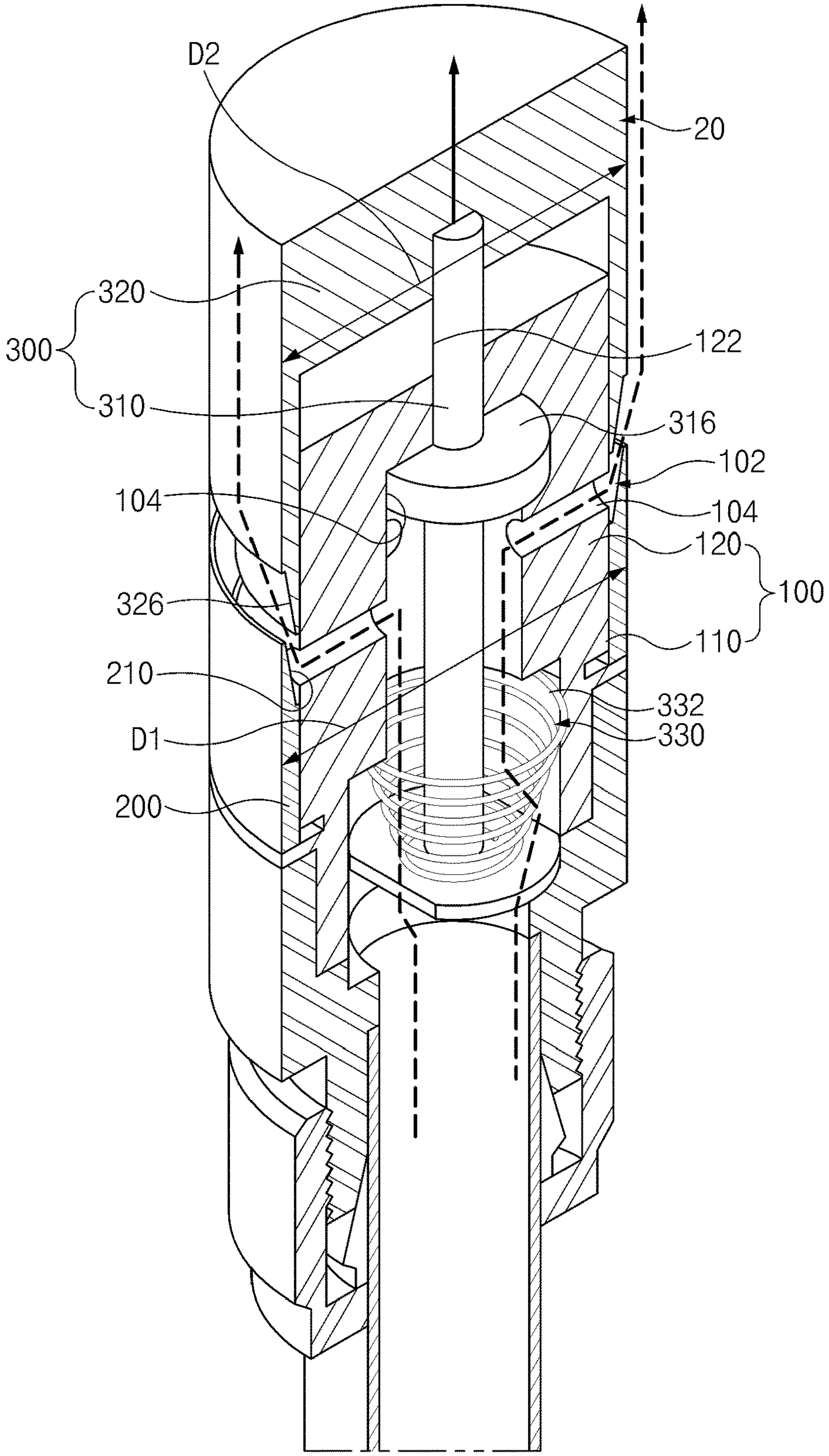
FIG. 3 is a schematic view of an opened state of a discharge part of the opening/closing apparatus according to the embodiment of the present disclosure.
Figure 4:
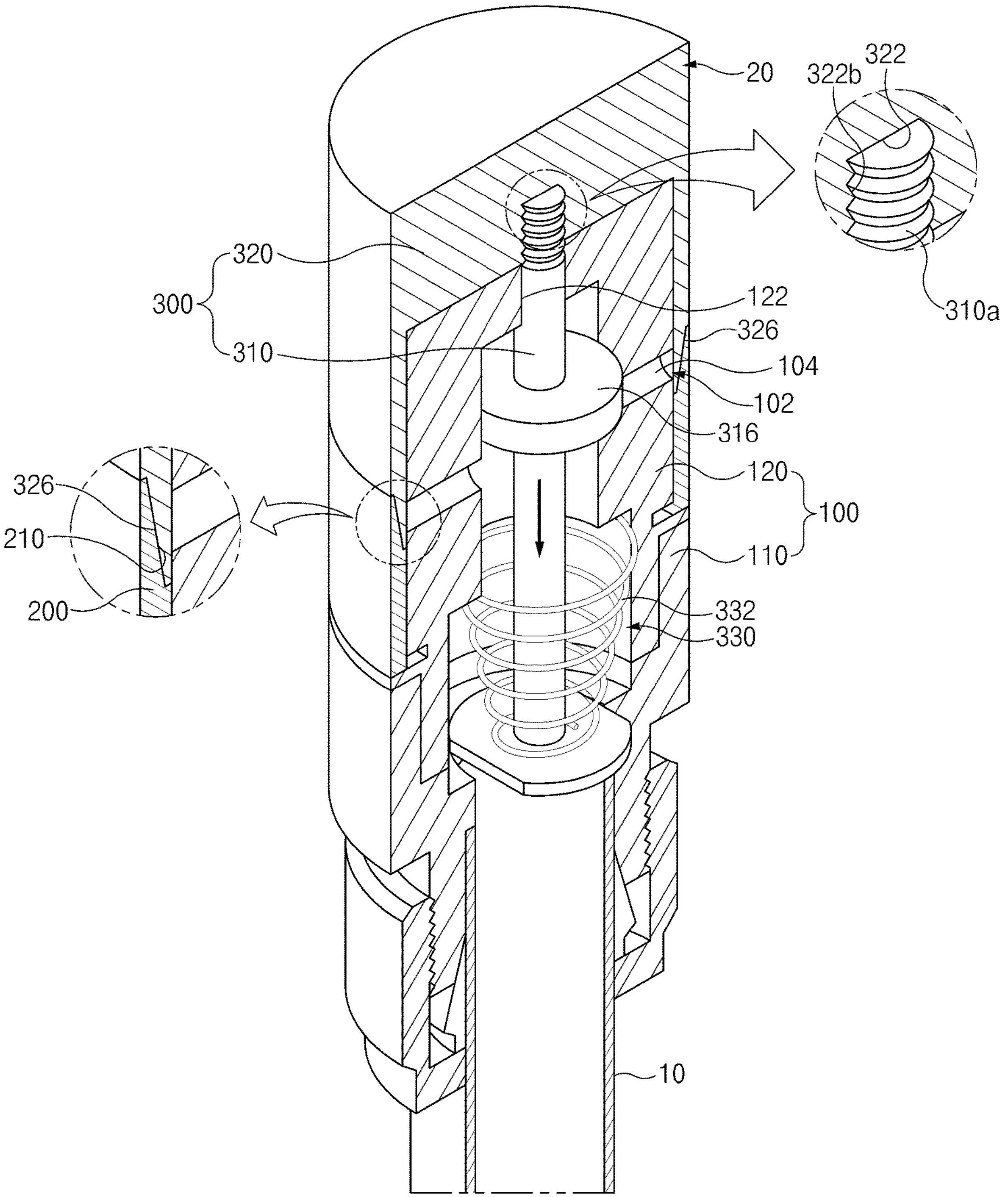
FIG. 4 is a schematic view of a closed state of the discharge part of the opening/closing apparatus according to the embodiment of the present disclosure.
Figure 7:
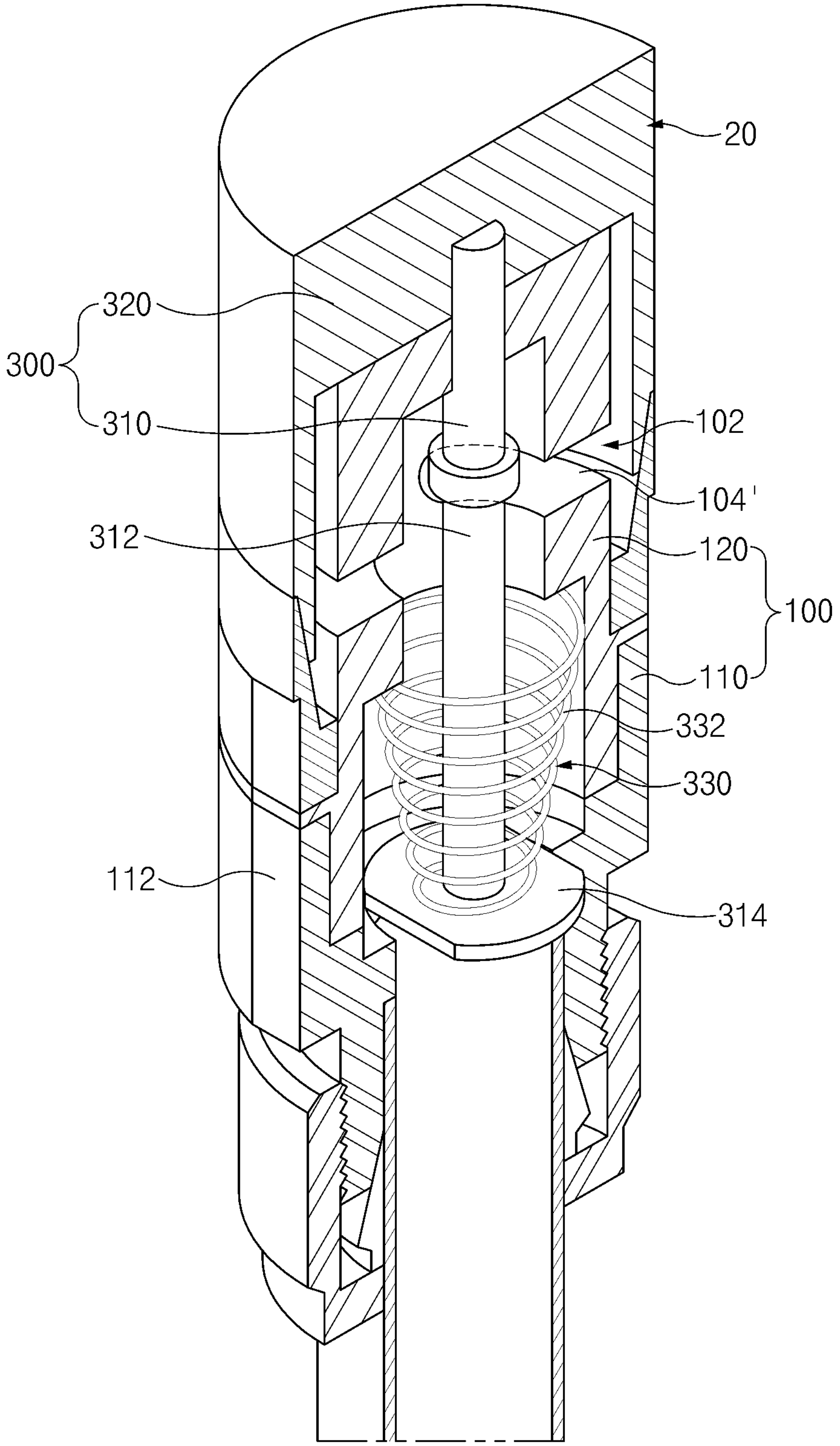
FIG. 7 is a schematic view of a modified example of the discharge part of the opening/closing apparatus according to the embodiment of the present disclosure.

For example, with reference to FIGS. 2 to 4, the discharge hole 104 may have a circular shape. Alternatively, as illustrated in FIG. 7, a discharge hole 104' may have an elliptical shape or be provided in the form of a slot having a length larger than a width.

The discharge hole 104 may be variously changed in size and number in accordance with required conditions and design specifications.

In particular, a sum of cross-sectional areas of the plurality of discharge holes 104 may be defined to be larger than a cross-sectional area of the discharge line 10.

As described above, because the sum of the cross-sectional areas of the plurality of discharge holes 104 is larger than the cross-sectional area of the discharge line 10, it is possible to reduce the pressure of the target fluid passing through the discharge hole 104 and induce a more effective discharge of the target fluid.

For reference, the number of discharge holes 104 may appropriately vary depending on a size (cross-sectional area) of the discharge hole 104 in accordance with required conditions and design specifications. For example, as illustrated in FIG. 7, the number of discharge holes 104 may decrease in case that the size of the discharge hole 104 is large. As illustrated in FIG. 2, the number of discharge holes 104 may increase in case that the size of the discharge hole 104 is small.

The body part 100 may have various structures having the discharge part 102. The present disclosure is not restricted or limited by the structure of the body part 100.

According to the exemplary embodiment of the present disclosure, the body part 100 may include a first body 110 connected to the outlet end of the discharge line 10, and a second body 120 having a passing hole 122 through which a part of a shaft part 310 may pass, the second body 120 being configured to define an accommodation space for accommodating the shaft part 310 in cooperation with the first body 110.

For example, the first body 110 and the second body 120 may be provided to collectively define an approximately hollow cylindrical shape. The discharge part 102 may be configured to penetrate a sidewall of the second body 120.

According to another embodiment of the present disclosure, the discharge part may be provided in a sidewall of the first body. Further, in the embodiment of the present disclosure illustrated and described above, the example has been described in which the body part 100 includes the two bodies. However, according to another embodiment of the present disclosure, the body part may be configured as a single body or include three or more bodies.

The first body 110 may be connected to the outlet end of the discharge line 10 by a method such as coupling (fastening) or welding. The present disclosure is not restricted or limited by the connection structure of the first body 110 to the discharge line 10.

The guide part 200 is configured to surround the periphery of the discharge part 102 to guide the target fluid, which has passed through the discharge part 102, in the first direction (the gravitational direction or the upward direction).

The guide part 200 may have various structures capable of guiding, in the first direction, the target fluid having passed through the discharge part 102. The present disclosure is not restricted or limited by the structure and shape of the guide part 200.

For example, the guide part 200 may have an approximately hollow ring shape and be disposed to surround the periphery of the discharge part 102. The target fluid having passed through the discharge part 102 may collide with the guide part 200 and then be guided in the first direction (upward direction) along the guide part 200.

For reference, in the embodiment of the present disclosure illustrated and described above, the example has been described in which the guide part 200 is provided separately from the body part 100 and assembled to the body part 100. However, according to another embodiment of the present disclosure, the guide part may be provided integrally with an outer peripheral surface of the body part.

According to the exemplary embodiment of the present disclosure, the opening/closing apparatus 20 may include an inclined guide portion 210 provided on an inner surface of the guide part 200 so as to face the discharge part 102 and configured to guide the target fluid in the upward direction.

The inclined guide portion 210 may be variously changed in angle in accordance with required conditions and design specifications. The present disclosure is not restricted or limited by the angle of the inclined guide portion 210.

As described above, in the embodiment of the present disclosure, because the inclined guide portion 210 is provided on the inner surface of the guide part 200, the target fluid discharged through the discharge part 102 may naturally flow in the upward direction along the inclined guide portion 210. Therefore, it is possible to obtain an advantageous effect of further improving performance and efficiency in discharging the target fluid.

As described above, in the embodiment of the present disclosure, the outlet end of the discharge part 102 may be directed in the second direction (e.g., horizontal direction), which intersects the first direction, instead of the first direction (gravitational direction), and the target fluid having passed through the discharge part 102 maybe guided in the first direction by means of the guide part 200. Therefore, it is possible to obtain an advantageous effect of meeting the regulations related to the discharge direction of the target fluid (the target fluid needs to be discharged upward in the gravitational direction), preventing the target fluid from being introduced into an object (e.g., vehicle), minimizing a degree to which rainwater, foreign substances, and the like are introduced through the outlet end of the discharge part 102, and improving safety and reliability.

Among other things, in the embodiment of the present disclosure, the discharge part 102 configured to discharge the target fluid may be exposed through a lateral side of the body part 100 without being exposed in the upward direction (gravitational direction). Therefore, it is possible to obtain an advantageous effect of minimizing a degree to which foreign substances such as rainwater are introduced into the discharge part 102.

The opening/closing part 300 is configured to selectively open or close the discharge part 102 based on the discharge pressure of the target fluid.

The opening/closing part 300 may have various structures capable of selectively opening or closing the discharge part 102 based on the discharge pressure of the target fluid. The present disclosure is not restricted or limited by the structure and operating method of the opening/closing part 300.

According to the exemplary embodiment of the present disclosure, the opening/closing part 300 may include the shaft part 310 configured to be selectively movable upward or downward relative to the body part 100 in response to pressure of the target fluid, and a cap member 320 connected to the shaft part 310 and configured to be movable in response to the upward or downward movement of the shaft part 310 from a first position at which the cap member 320 closes the discharge part 102 to a second position at which the cap member 320 opens the discharge part 102.

For example, the shaft part 310 may be accommodated in the body part 100 so as to move upward or downward in response to the discharge pressure of the target fluid. One end of the shaft part 310 may be exposed to outside of the second body 120 through the passing hole 122 provided in the second body 120.

The shaft part 310 may have various structures capable of moving upward or downward in response to the discharge pressure of the target fluid. The present disclosure is not restricted or limited by the structure of the shaft.

According to the exemplary embodiment of the present disclosure, the shaft part 310 may include a shaft body 312 configured to be accommodated in the body part 100 so as to be movable upward or downward, and a shaft plate 314 provided at an end of the shaft body 312 so as to cover the discharge line 10 and configured to selectively move upward or downward in response to the discharge pressure of the target fluid.

For example, the shaft body 312 may be provided in the form of a straight rod having an approximately circular cross-section. The shaft plate 314 may be integrated with an end (a lowermost end based on FIG. 2) of the shaft body 312 adjacent to the outlet end of the discharge line 10 so as to have a cross-sectional area (e.g., an approximately elliptical shape) further expanded than that of the shaft body 312.

The shaft plate 314 may be disposed to cover (close) the outlet end of the discharge line 10. When the target fluid is discharged along the discharge line 10, the shaft plate 314 may be moved (raised) in the upward direction by pressure (discharge pressure of the target fluid) applied to a bottom surface (based on FIG. 3) of the shaft plate 314.

The cap member 320 is configured to selectively open or close the discharge part 102 while operating in conjunction with the ascent and descent (upward and downward movements) of the shaft part 310.

More specifically, the cap member 320 may be connected to the shaft part 310 through the passing hole 122. In response to the upward or downward movement of the shaft part 310, the cap member 320 is configured to move from the first position at which the cap member 320 closes the discharge part 102 to the second position at which the cap member 320 opens the discharge part 102.

The cap member 320 may be connected to various structures capable of operating in conjunction with the shaft part 310. The present disclosure is not restricted or limited by the connection structure between the cap member 320 and the shaft part 310.

According to the exemplary embodiment of the present disclosure, the cap member 320 may be connected to one end of the shaft part 310 exposed to the outside of the second body 120 through the passing hole 122 of the second body 120.

The cap member 320 may have various structures capable of selectively closing the discharge part 102 in response to the upward or downward movement of the shaft part 310. The present disclosure is not restricted or limited by the structure of the cap member 320.

According to the exemplary embodiment of the present disclosure, the cap member 320 may include a cap head 322 connected to one end of the shaft part 310, and a cap body 324 provided along a periphery of an edge of the cap head 322 and configured to cover the discharge part 102 and selectively open or close the discharge part 102 in response to the upward or downward movement of the shaft part 310.

For example, the cap head 322 may have an approximately circular plate shape having a diameter corresponding to the body part 100. The cap body 324 may have a continuous ring shape along a periphery of the edge of the cap head 322. An end of the shaft body 312 may be connected to an inner surface of the cap head 322.

For reference, in the embodiment of the present disclosure illustrated and described above, the example has been described in which the cap body 324 has a continuous ring shape along the periphery of the edge of the cap head 322. However, according to another embodiment of the present disclosure, a plurality of cap bodies may be provided to be spaced apart from one another in a circumferential direction of the cap head.

According to the exemplary embodiment of the present disclosure, the opening/closing apparatus 20 may include an accommodation portion 322*a* provided in the cap head 322 and configured to accommodate one end (an end of the shaft body) of the shaft part 310. The arrangement state (connection state) of the cap member 320 with respect to the shaft part 310 maybe fixed as one end of the shaft part 310 is accommodated in the accommodation portion 322*a*.

In particular, the opening/closing apparatus 20 may include a first screw thread portion 310*a* provided on an outer peripheral surface of one end of the shaft part 310, and a second screw thread portion 322*b* provided on an inner peripheral surface of the accommodation portion 322*a* and configured to engage with a first screw thread portion 310*a*.

For example, the first screw thread portion 310*a* may be provided in the form of an internal thread, and the second screw thread portion 322*b* may be provided in the form of an external thread. Because the second screw thread portion 322*b* is fastened to the first screw thread portion 310*a*, it is possible to obtain an advantageous effect of securely maintaining the arrangement state (connection state) of the cap member 320 with respect to the shaft part 310 and preventing the separation of the cap member 320.

According to another embodiment of the present disclosure, the first screw thread portion may be provided as an external thread, and the second screw thread portion may be provided as an internal thread.

For reference, in the embodiment of the present disclosure illustrated and described above, the example has been described in which the second screw thread portion 322*b* is provided directly on the inner peripheral surface of the accommodation portion 322*a*. However, according to another embodiment of the present disclosure, a separate fastening member (not illustrated) may be provided in the accommodation portion, and the second screw thread portion may be provided on the fastening member.

For example, the fastening member having an approximately hollow nut structure may be accommodated in ((e.g., coupled, in an interference-fit manner, to or bonded to) the accommodation portion, and the second screw thread portion provided in the fastening member may be fastened to the first screw thread portion of the shaft part.

With the above-mentioned structure, when the discharge pressure of the target fluid is applied to the shaft plate 314 in a state in which the cap member 320 is disposed to close the discharge part 102, the shaft body 312 may move in the upward direction together with the shaft plate 314, as illustrated in FIG. 3. Therefore, the cap member 320 connected to the shaft body 312 moves in the upward direction, such that the discharge part 102 may be opened, and the target fluid may be discharged to outside through the discharge part 102.

In contrast, with reference to FIG. 4, when the pressure applied to the shaft plate 314 is eliminated (the target fluid is completely discharged), the cap member 320 may be autonomously moved in the downward direction (in the first position) by its own weight (weights of the shaft part and the cap member) and close the discharge part 102.

With reference to FIGS. 1 to 4, according to the exemplary embodiment of the present disclosure, the opening/closing apparatus 20 may include an elastic support part 330 configured to provide an elastic force to move the cap member 320 from the second position at which the cap member 320 opens the discharge part 102 to the first position at which the cap member 320 closes the discharge part 102.

As described above, in the embodiment of the present disclosure, the movement of the shaft part 310 relative to the body part 100 may be elastically supported by the elastic support part 330. Therefore, it is possible to obtain an advantageous effect of stably maintaining the state in which the cap member 320 is disposed at the first position (the state in which the discharge part is closed) and minimizing malfunction of the cap member 320 caused by impact or the like.

For reference, when the pressure applied to the shaft plate 314 is eliminated (the target fluid is completely discharged) in the state in which the cap member 320 is moved in the upward direction (to the second position), the cap member 320 may be moved in the downward direction (to the first position) by its own weight (the weights of the shaft part and the cap member) and the elastic force of the elastic support part 330 and close the discharge part 102.

A typical elastic member capable of elastically supporting the movement of the shaft part 310 relative to the body part 100 may be used as the elastic support part 330. The present disclosure is not restricted or limited by the type and structure of the elastic support part 330.

For example, the elastic support part 330 may include a spring member 332 having one end (an upper end based on FIG. 4) supported on the body part 100, and the other end (a lower end based on FIG. 4) supported on the shaft part 310.

In particular, the spring member 332 may be provided in the form of a conical spring (tapered spring) having a diameter that gradually decreases in a direction from one end to the other end. For example, one end of the spring member may be supported on a support projection (not illustrated) provided on an inner surface of the second body 120, and the other end of the spring member may be supported on an upper surface of the shaft plate 314.

As described above, in the embodiment of the present disclosure, because the spring member 332 is provided in the form of a conical spring, it is possible to obtain an advantageous effect of ensuring assembling properties of the spring member 332 and minimizing swaying (free movements in leftward/rightward directions) of the spring member.

With reference to FIGS. 1 to 4, according to the exemplary embodiment of the present disclosure, the opening/closing apparatus 20 may include a stopper 316 configured to restrict the movement of the cap member 320 relative to the body part 100 when the discharge part 102 is opened.

The stopper 316 is configured to suppress an excessive movement of the cap member 320 relative to the body part 100 (an additional movement of the cap member in the state in which the cap member is moved to the second position).

The stopper 316 may have various structures capable of suppressing the movement (the upward movement) of the cap member 320 in the state in which the cap member 320 is moved to the second position. The present disclosure is not restricted or limited by the structure of the stopper 316.

For example, the stopper 316 may have a cross-sectional area further expanded than that of the shaft body 312 (a cross-sectional area larger than that of the passing hole) and be provided on the shaft part 310 (an outer peripheral surface of the shaft body) so as to be restrained by an inner surface of the body part 100 (an inner surface of the second body).

With the above-mentioned structure, when the shaft body 312 is moved in the upward direction in a predetermined section by the discharge pressure of the target fluid applied to the shaft plate 314, the stopper 316 comes into contact with the inner surface of the body part 100, such that the movement of the shaft part 310 may be restricted.

In the embodiment of the present disclosure illustrated and described above, the example has been described in which the stopper 316 restricts the movement of the shaft part 310 relative to the body part 100. However, the stopper 316 may be configured to restrict the movement of the cap member 320 relative to the body part 100.

The shaft part 310 and the stopper 316 may be made of various materials in accordance with required conditions and design specifications. The present disclosure is not restricted or limited by the materials of the shaft part 310 and the stopper 316.

In particular, because the shaft part 310 and the stopper 316 are exposed directly to the target fluid (e.g., hydrogen), the shaft part 310 and the stopper 316 may each be made of a material capable of minimizing deformation and damage caused by the target fluid. For example, the shaft part 310 and the stopper 316 may be made of SUS316 strong against hydrogen brittleness. Alternatively, the shaft part 310 and the stopper 316 may be made of other metallic materials or synthetic resin materials.

Figure 5:
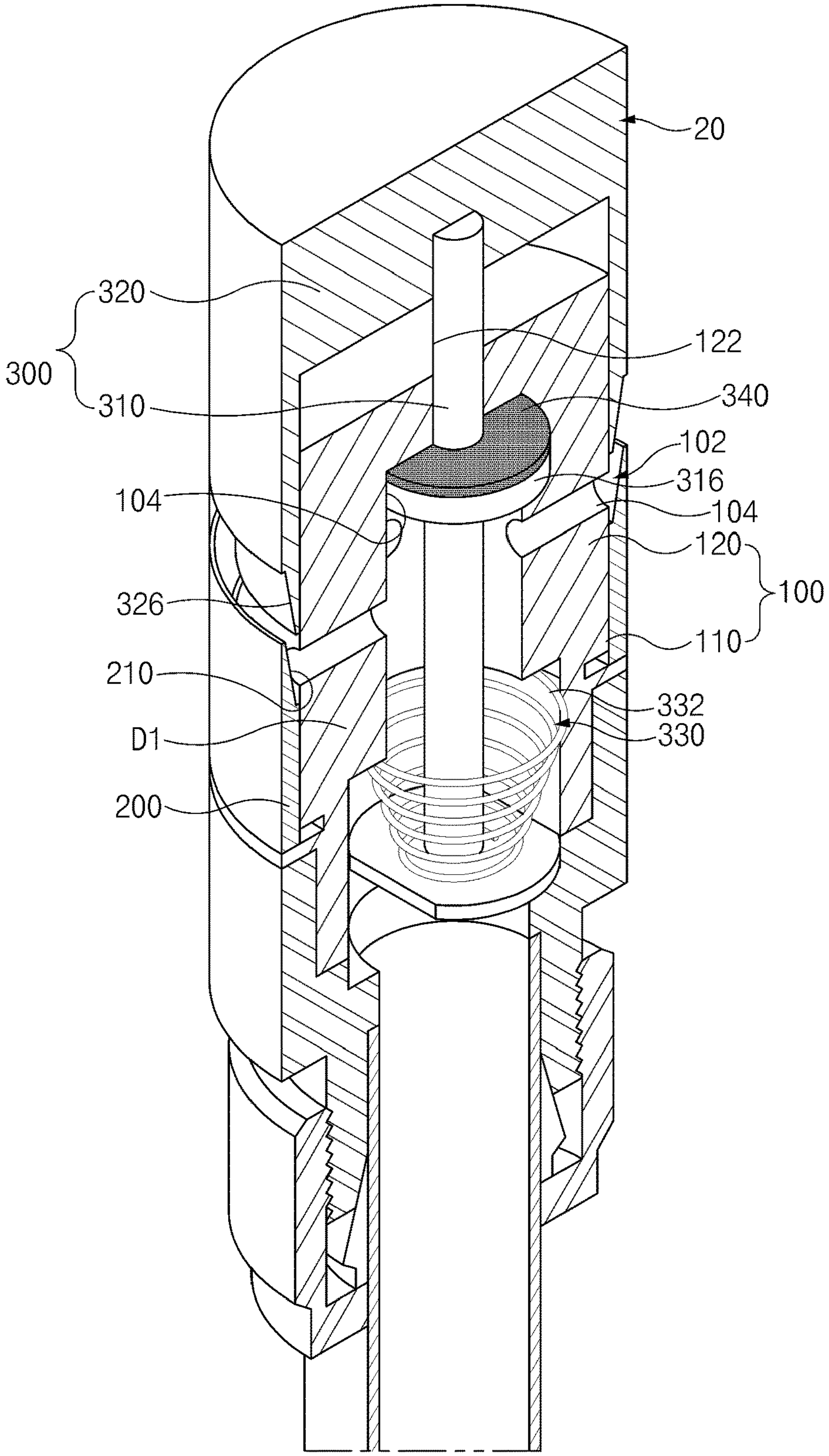
FIGS. 5 and 6 are schematic views of a sealing member of the opening/closing apparatus according to the embodiment of the present disclosure.
Figure 6:
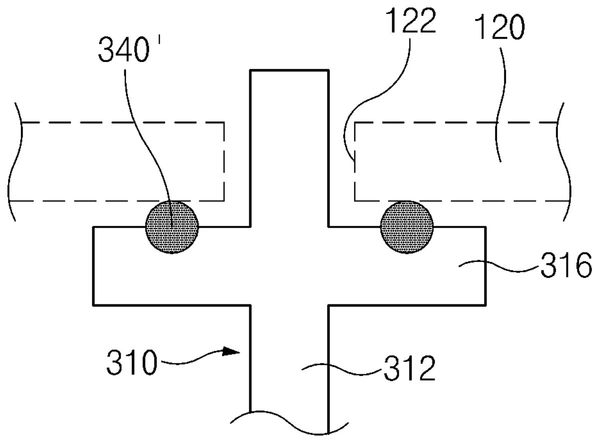

Meanwhile, with reference to FIGS. 5 and 6, according to the exemplary embodiment of the present disclosure, the opening/closing apparatus 20 may include a sealing member 340 configured to seal a gap between the passing hole 122 and the shaft part 310.

The sealing member 340 is provided to seal a gap between the passing hole 122 and the shaft part 310 to prevent the discharge pressure of the target fluid from being applied to the inner surface of the cap member 320 through the gap between the passing hole 122 and the shaft part 310.

The sealing member 340 may have various structures capable of sealing (blocking) the gap between the passing hole 122 and the shaft part 310. The present disclosure is not restricted or limited by the type and structure of the sealing member 340.

In addition, the sealing member 340 may be made of a typical elastic material such as elastomer, rubber, or silicone that is elastically compressible and restorable. The present disclosure is not restricted or limited by the material and properties of the sealing member 340.

For example, with reference to FIG. 5, the sealing member 340 may have a circular plate shape having a diameter corresponding to the stopper 316 and be interposed between the stopper 316 and the inner surface of the second body 120.

As another example, with reference to FIG. 6, a sealing member 340' may have a circular ring shape having a diameter smaller than that of the stopper 316 and be interposed between the stopper 316 and the inner surface of the second body 120. In addition, an accommodation groove (not illustrated) may be provided in an upper surface of the stopper 316, and the sealing member 340' may be accommodated in the accommodation groove.

As described above, in the embodiment of the present disclosure, because the gap between the passing hole 122 and the shaft part 310 is blocked by the sealing member 340 or 340', it is possible to suppress the discharge pressure of the target fluid from being applied to the inner surface of the cap member 320 through the gap between the passing hole 122 and the shaft part 310. Therefore, it is possible to obtain an advantageous effect of suppressing the separation of the cap member 320 caused by the discharge pressure of the target fluid and stably maintaining the arrangement state of the cap member 320.

With reference to FIG. 3, according to the exemplary embodiment of the present disclosure, the cap member 320 may have an outer diameter corresponding to the guide part 200.

In this case, the configuration in which the cap member 320 has the outer diameter corresponding to the guide part 200 may be defined as a configuration in which an outer diameter D1 of the guide part 200 and an outer diameter D2 of the cap member 320 correspond to each other.

This is based on the Coanda effect that states that a fluid (target fluid) has the property of flowing along a flow surface of an object (adhering to the flow surface). Because the cap member 320 has the outer diameter corresponding to the guide part 200, the target fluid being discharged along the guide part 200 may be moved in the first direction (gravitational direction) along the peripheral surface of the cap member 320 by the Coanda effect. Therefore, it is possible to obtain an advantageous effect of more assuredly meeting the regulations related to the discharge direction of the target fluid.

In particular, the outer diameter D1 of the guide part 200 and the outer diameter D2 of the cap member 320 may be defined to be equal to each other (D1=D2).

With reference to FIG. 4, according to the exemplary embodiment of the present disclosure, the opening/closing apparatus 20 may include an inclined contact portion 326 provided on the cap member 320. When the cap member 320 moves to the first position, the inclined contact portion 326 may come into contact with the inclined guide portion 210.

The inclined contact portion 326 may have various structures capable of coming into contact with the inclined guide portion 210. The present disclosure is not restricted or limited by the structure and angle of the inclined contact portion 326.

For example, the inclined contact portion 326 may have an angle corresponding to the inclined guide portion 210. When the cap member 320 moves to the first position, the inclined contact portion 326 may come into contact with the inclined guide portion 210. In particular, the inclined contact portion 326 may come into close (surface) contact with the inclined guide portion 210.

As described above, the embodiment of the present disclosure may provide a double-closing structure in which the cap member 320 closes the discharge part 102 and the contact between the inclined contact portion 326 and the inclined guide portion 210 closes the discharge part 102. Therefore, it is possible to obtain an advantageous effect of more stably maintaining the closed state of the discharge part 102 and more effectively suppressing the introduction of foreign substances into the discharge part 102.

In addition, with reference to FIG. 7, according to the exemplary embodiment of the present disclosure, the body part 100 may have a tool seat portion 112 for fastening a fastening tool.

The tool seat portion 112 may be configured to inhibit a slip of the fastening tool (e.g., a wrench) and ensure a smooth rotation of the body part 100 (a rotation by the fastening tool).

For example, the tool seat portion 112 may be configured by providing flat surfaces on outer peripheral surfaces of the first and second bodies 110 and 120. For example, the tool seat portion may be provided by partially removing (e.g., machining (cutting)) the outer peripheral surfaces of the first and second bodies 110 and 120.

Meanwhile, in the embodiment of the present disclosure illustrated and described above, the example has been described in which the cap member is connected to one end of the shaft part exposed to outside of the body part (second body) through the passing hole. However, according to another embodiment of the present disclosure, a connection protrusion, which may be accommodated in the passing hole, may be provided on the inner surface of the cap member, and the shaft part and the cap member may be connected by means of the connection protrusion.

Figure 8:
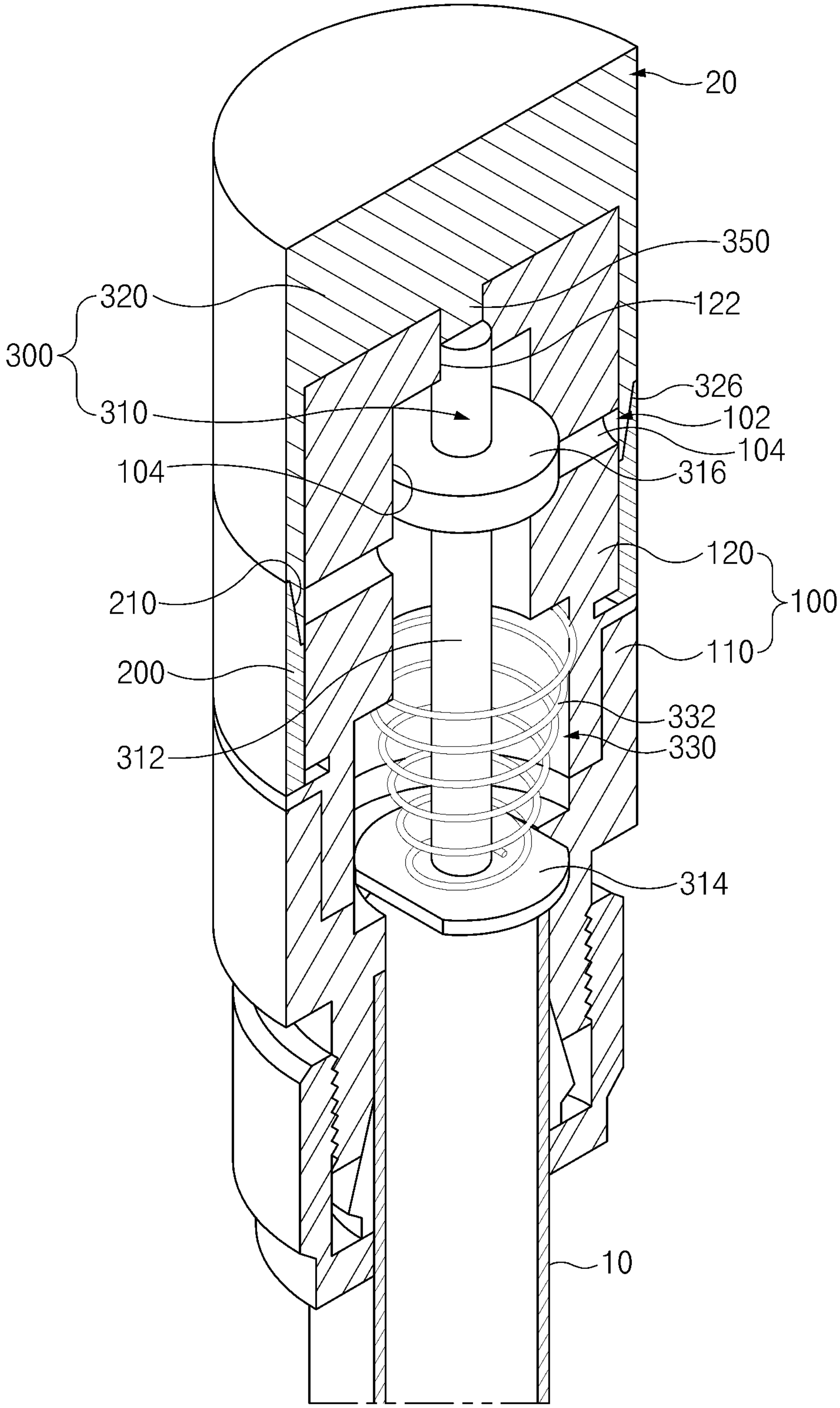
FIGS. 8 and 9 are schematic views of a connection protrusion of the opening/closing apparatus according to the embodiment of the present disclosure.

For example, with reference to FIG. 8, the opening/closing apparatus 20 may include a connection protrusion 350 protruding from the inner surface of the cap member 320 (the inner surface of the cap head) so as to be accommodated (inserted) into the passing hole 122. The shaft part 310 and the cap member 320 may be connected (e.g., fastened or joined) to each other by means of the connection protrusion 350.

Figure 9:
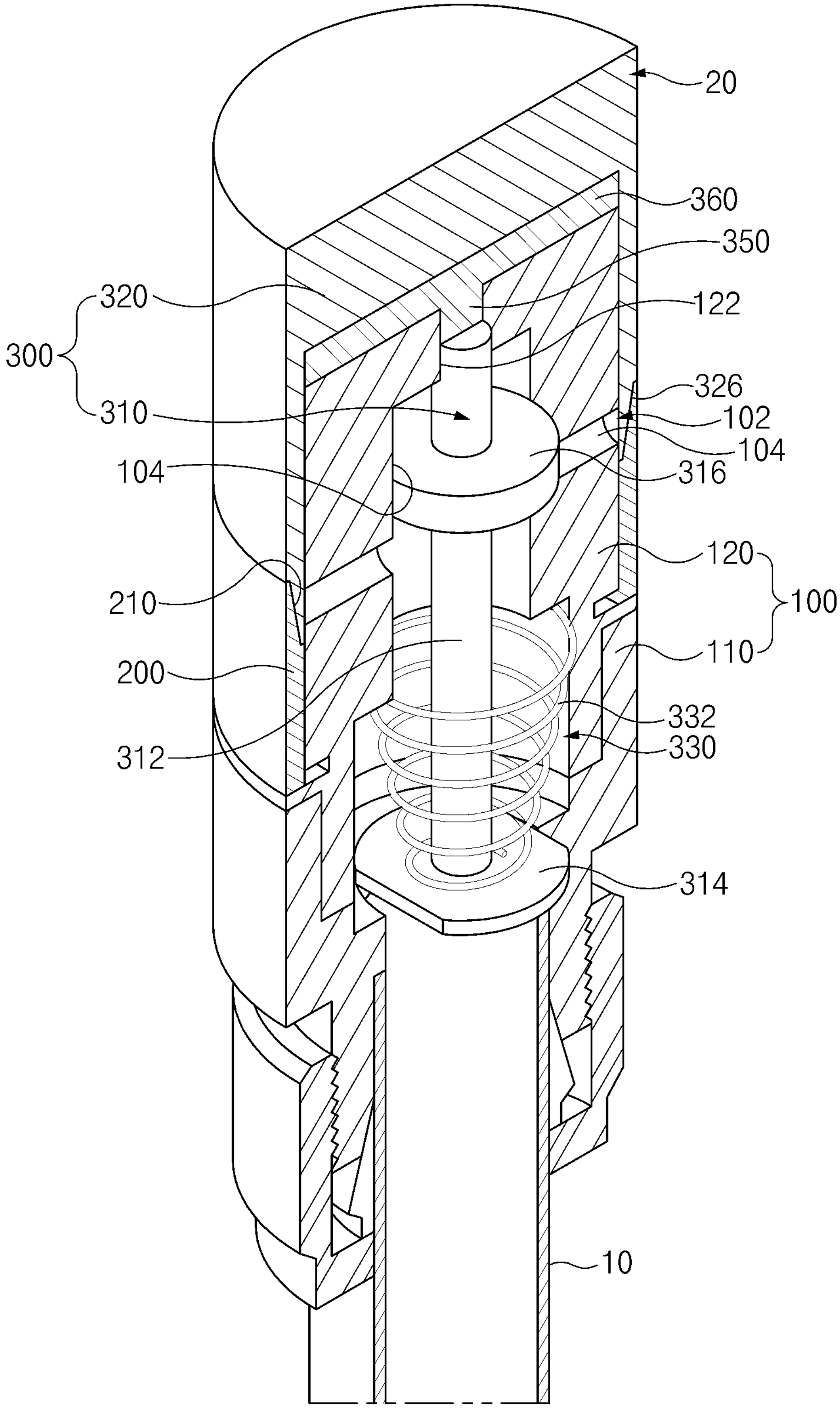

As another example, with reference to FIG. 9, the opening/closing apparatus 20 may include a connection plate 360 provided outside the body part 100 (an upper portion of the second body) so as to be accommodated in the cap member 320, and a connection protrusion 350 protruding from one surface (a bottom surface based on FIG. 9) of the connection plate 360 so as to be accommodated (inserted) into the passing hole 122. The shaft part 310 and the cap member 320 may be connected (e.g., fastened or joined) to each other by means of the connection protrusion 350.

For example, the connection plate 360 and the connection protrusion 350 may be provided to collectively define an approximately 'T'-shaped cross-sectional shape.

The connection plate 360 may be fastened (e.g., in an interference-fit manner or screw-fastened) or bonded to the inside of the cap member 320. The present disclosure is not restricted or limited by the connection structure between the connection plate 360 and the cap member 320.

In the embodiment of the present disclosure illustrated and described above, the example has been described in which the connection plate and the shaft part are connected by means of the connection protrusion. However, according to another embodiment of the present disclosure, one end of the shaft part may be connected directly to the connection plate without a separate connection protrusion.

Figure 10:
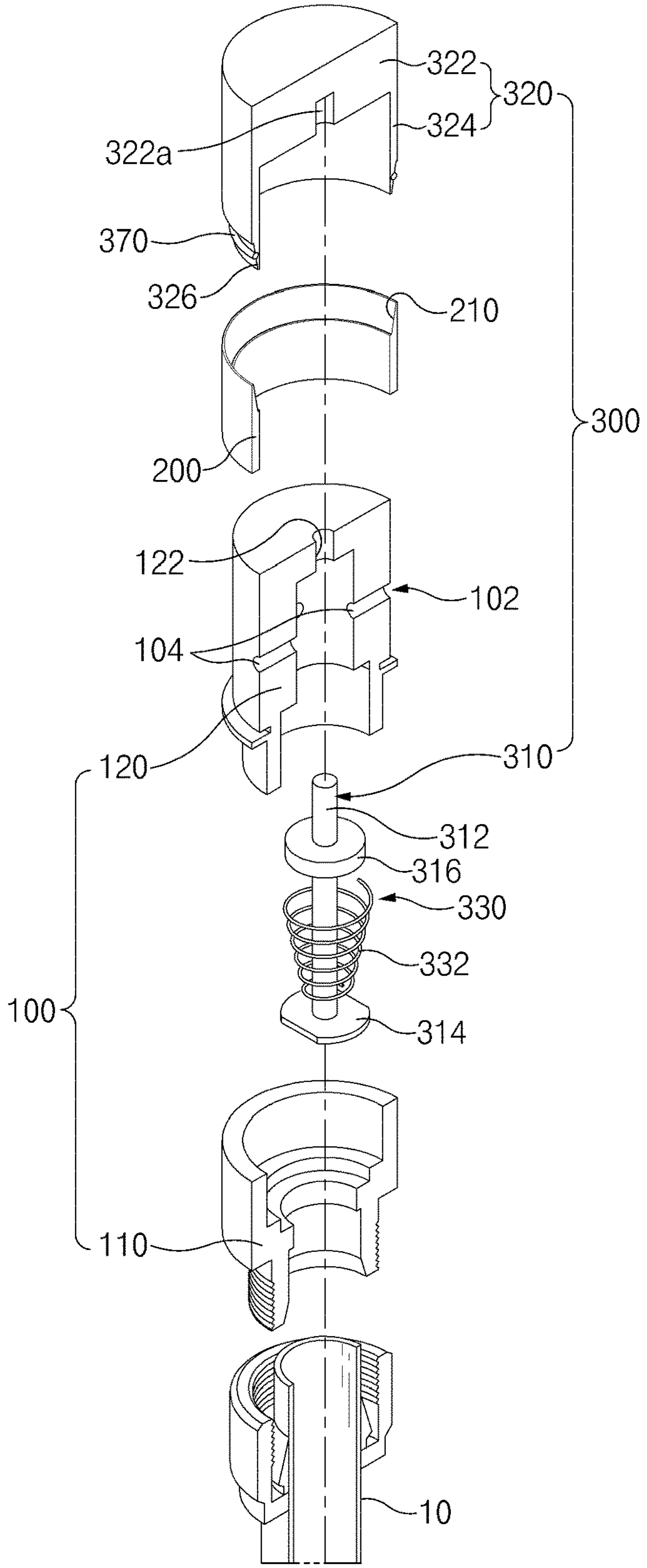
FIGS. 10 and 11 are schematic views of a cap sealing member of the opening/closing apparatus according to the embodiment of the present disclosure.
Figure 11:
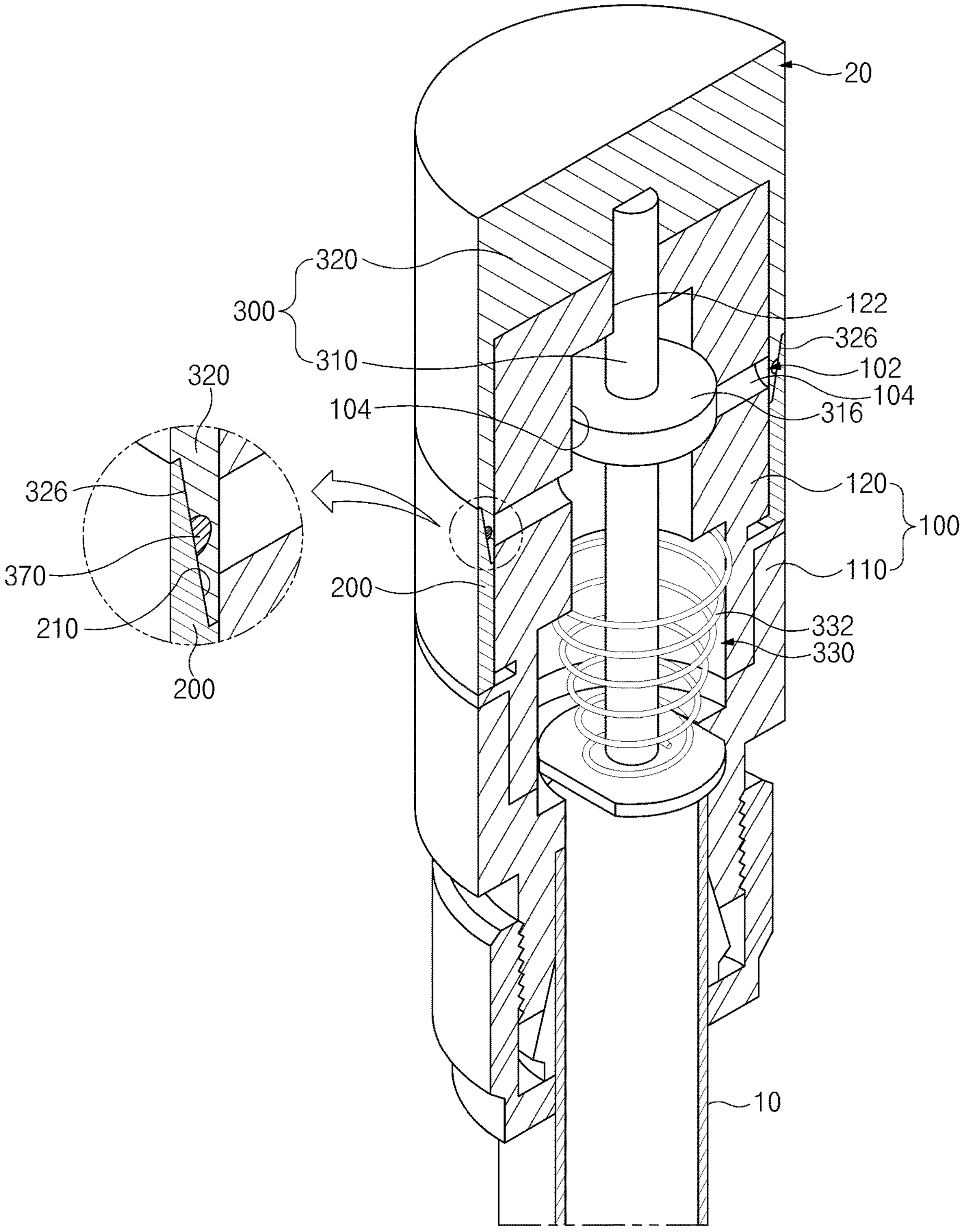

With reference to FIGS. 10 and 11, according to the exemplary embodiment of the present disclosure, the opening/closing apparatus 20 may include a cap sealing member 370 configured to seal a gap between the guide part 200 and the cap member 320.

The cap sealing member 370 is configured to prevent water from being introduced into the discharge part 102 (discharge hole) from outside of the cap member 320 through the gap between the guide part 200 and the cap member 320.

The cap sealing member 370 may have various structures capable of sealing (blocking) the gap between the guide part 200 and the cap member 320. The present disclosure is not restricted or limited by the type and structure of the cap sealing member 370.

For example, the cap sealing member 370 may have a circular ring shape and be interposed in the gap between the guide part 200 and the cap member 320.

In addition, the cap sealing member 370 may be made of a typical elastic material such as elastomer, rubber, or silicone that is elastically compressible and restorable. The present disclosure is not restricted or limited by the material and properties of the cap sealing member 370.

According to the exemplary embodiment of the present disclosure, the cap sealing member 370 may be integrated, by injection molding (dual injection molding), with an outer surface of the inclined contact portion 326 that faces the inclined guide portion 210 so as to be in elastic contact with the inclined guide portion 210.

In the embodiment of the present disclosure illustrated and described above, the example has been described in which the cap sealing member 370 is provided on the cap member 320 by dual injection molding. However, according to another embodiment of the present disclosure, the cap sealing member may be attached or coupled to the cap member (e.g., the inclined contact portion). Alternatively, the cap sealing member may be provided on the guide part (e.g., the inclined guide portion) instead of the cap member.

As described above, in the embodiment of the present disclosure, because the cap sealing member 370 blocks the gap between the guide part 200 and the cap member 320, it is possible to obtain an advantageous effect of minimizing a degree to which water is introduced into the discharge part 102 (discharge hole) from the outside of the cap member 320 through the gap between the guide part 200 and the cap member 320.

In particular, in the embodiment of the present disclosure, because the cap sealing member 370 is provided in the gap between the guide part 200 and the cap member 320, it is possible to obtain an advantageous effect of minimizing a degree to which water, which is introduced in the horizontal direction, is introduced into the discharge part 102 (discharge hole) and the gap between the guide part 200 and the cap member 320.

As described above, according to the embodiment of the present disclosure, it is possible to obtain an advantageous effect of effectively protecting the outlet end of the discharge line while ensuring a stable discharge of the target fluid through the discharge line.

In particular, according to the embodiment of the present disclosure, it is possible to obtain an advantageous effect of suppressing introduction of foreign substances into the discharge line and improving safety and reliability while meeting the regulations related to the discharge direction of the target fluid (the target fluid needs to be discharged upward in a gravitational direction).

In addition, according to the embodiment of the present disclosure, it is possible to obtain an advantageous effect of stably protecting the outlet end of the discharge line without performing a separate additional assembling process after the outlet end of the discharge line is opened (the target fluid is discharged).

In addition, according to the embodiment of the present disclosure, when the target fluid is completely discharged through the discharge line, the cap member may be autonomously moved back to the position at which the cap member closes the discharge part.

In addition, according to the embodiment of the present disclosure, it is possible to obtain an advantageous effect of preventing a loss of the cap member.

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. An opening/closing apparatus comprising:

a body part provided at an outlet end of a discharge line configured to discharge a target fluid to outside in a first direction, the body part having a discharge part configured to discharge the target fluid to the outside in a second direction intersecting the first direction;

a guide part configured to surround a periphery of the discharge part and guide the target fluid, which has passed through the discharge part, in the first direction; and an opening/closing part configured to selectively open or close the discharge part based on discharge pressure of the target fluid, wherein the opening/closing part comprises:

a shaft part configured to be selectively movable upward or downward relative to the body part in response to pressure of the target fluid; and a cap member connected to the shaft part and configured to be movable in response to the upward or downward movement of the shaft part from a first position at which the cap member closes the discharge part to a second position at which the cap member opens the discharge part, wherein the shaft part comprises:

a shaft body accommodated in the body part so as to be movable upward or downward; and a shaft plate provided at an end of the shaft body so as to cover the discharge line and configured to be selectively movable upward or downward in response to discharge pressure of the target fluid, and wherein the cap member is moved downward to the first position by its own weight when the discharge pressure of the target fluid applied to the shaft plate is eliminated.

2. The opening/closing apparatus of claim 1, wherein the body part comprises:

a first body connected to the outlet end; and a second body having a passing hole through which a part of the shaft part passes, the second body being configured to define an accommodation space for accommodating the shaft part in cooperation with the first body.

3. The opening/closing apparatus of claim 2, wherein one end of the shaft part is exposed to outside of the second body through the passing hole, and the cap member is connected to one end of the shaft part.

4. The opening/closing apparatus of claim 2, wherein the cap member comprises:

a cap head connected to one end of the shaft part; and a cap body configured to surround a periphery of an edge of the cap head so as to cover the discharge part and selectively open or close the discharge part in response to the upward or downward movement of the shaft part.

5. The opening/closing apparatus of claim 4, comprising:

an accommodation portion provided in the cap head and configured to accommodate one end of the shaft part.

6. The opening/closing apparatus of claim 5, comprising:

a first screw thread portion provided on an outer peripheral surface of one end of the shaft part; and a second screw thread portion provided on the accommodation portion and configured to engage with the first screw thread portion.

7. The opening/closing apparatus of claim 2, comprising:

a sealing member configured to seal a gap between the passing hole and the shaft part.

8. The opening/closing apparatus of claim 1, comprising:

an elastic support part comprising a spring member configured to provide an elastic force to move the cap member from the second position to the first position.

9. The opening/closing apparatus of claim 1, comprising:

a stopper provided on the shaft part, and configured to restrict movement of the cap member relative to the body part when the discharge part is opened.

10. The opening/closing apparatus of claim 1, wherein the discharge part comprises a plurality of discharge holes spaced apart from one another in a circumferential direction of the body part.

11. The opening/closing apparatus of claim 10, wherein a sum of cross-sectional areas of the plurality of discharge holes is larger than a cross-sectional area of the discharge line.

12. The opening/closing apparatus of claim 1, further comprising:

an inclined guide portion provided on an inner surface of the guide part so as to face the discharge part and configured to guide the target fluid in an upward direction.

13. The opening/closing apparatus of claim 12, further comprising:

an inclined contact portion provided on the cap member, wherein the inclined contact portion is configured to come into contact with the inclined guide portion when the cap member moves to the first position.

14. The opening/closing apparatus of claim 13, comprising:

a cap sealing member configured to seal a gap between the guide part and the cap member.

15. A vehicle comprising the opening/closing apparatus of claim 1.

16. A fuel cell electric vehicle comprising the opening/closing apparatus of claim 1.

17. An opening/closing apparatus comprising:

a body part provided at an outlet end of a discharge line configured to discharge a target fluid to outside in a first direction, the body part having a discharge part configured to discharge the target fluid to the outside in a second direction intersecting the first direction;

a guide part configured to surround a periphery of the discharge part and guide the target fluid, which has passed through the discharge part, in the first direction; and an opening/closing part configured to selectively open or close the discharge part based on discharge pressure of the target fluid, wherein the opening/closing part comprises:

a shaft part configured to be selectively movable upward or downward relative to the body part in response to pressure of the target fluid; and a cap member connected to the shaft part and configured to be movable in response to the upward or downward movement of the shaft part from a first position at which the cap member closes the discharge part to a second position at which the cap member opens the discharge part, and wherein the cap member is provided to have an outer diameter corresponding to the guide part.

* * * * *